US012752143B1

(12) United States Patent
Braun et al.

(10) Patent No.: US 12,752,143 B1
(45) Date of Patent: Oct. 6, 2026

(54) SYSTEM AND METHOD FOR PFAS CONTAMINATED WASTE POLYMER SOLIDIFICATION

(71) Applicant: AVANTech, LLC, Columbia, SC (US)

(72) Inventors: James Braun, Blythewood, SC (US); Michael Reed, Columbia, SC (US); Vahid Gholami, Columbia, SC (US)

(73) Assignee: AVANTech, LLC, Columbia, SC (US)

( * ) Notice: Subject to any disclaimer, the term of this patent is extended or adjusted under 35 U.S.C. 154(b) by 1022 days.

(21) Appl. No.: 17/676,368

(22) Filed: Feb. 21, 2022

Related U.S. Application Data

(60) Provisional application No. 63/151,958, filed on Feb. 22, 2021.

(51) Int. Cl.

| | |
|---|---|
| ***A62D 3/30*** | (2007.01) |
| ***A62D 3/33*** | (2007.01) |
| *A62D 101/22* | (2007.01) |

(52) U.S. Cl.
CPC ................. *A62D 3/30* (2013.01); *A62D 3/33* (2013.01); *A62D 2101/22* (2013.01)

(58) Field of Classification Search
None
See application file for complete search history.

(56) References Cited

U.S. PATENT DOCUMENTS

| | | | | |
|---|---|---|---|---|
| 2020/0179904 | A1* | 6/2020 | Hull | B01J 20/28021 |
| 2021/0170363 | A1* | 6/2021 | Thoreson | B01J 20/28016 |

FOREIGN PATENT DOCUMENTS

| | | | | |
|---|---|---|---|---|
| WO | WO-2021084119 A1 * | 5/2021 | | B01D 15/02 |

OTHER PUBLICATIONS

Li et al. "Chemical regeneration of spent powder activated carbon used in decolorization of sodium salicylate for the pharmaceutical industry", Journal of Cleaner Production 86 (2015) 424-431 (Year: 2015).*

ECS-21302-20210913, "Cementitious Grout Recipe Selection for Anionic IX Resin," AVANTech, LLC. Sep. 2021. All enclosed pages cited.

"S. 1605—117th Congress (2021-2022): National Defense Authorization Act for Fiscal Year 2022." Congress.gov, Library of Congress, Dec. 27, 2021, https://www.congress.gov/bill/117th-congress/senate-bill/1605.

(Continued)

*Primary Examiner* — Coris Fung
(74) *Attorney, Agent, or Firm* — Nelson Mullins Riley & Scarborough LLP

(57) ABSTRACT

A system and method for per- and polyfluorinated substances (PFAS) contaminated waste polymer solidification is provided. The method includes providing a pressure vessel containing an ion exchange or adsorption media; capturing a per- and polyfluorinated substance (PFAS) via ion exchange or adsorption in the pressure vessel thereby contaminating the ion exchange or adsorption media; sluicing the ion exchange or adsorption media from the pressure vessel into a separate disposal vessel; introducing into the contaminated ion exchange or adsorption media in the disposal vessel a component, wherein the component is one or more of a polymer, co-polymer, and a bonding agent; forming a final product of a stabilized monolith from the contaminated ion exchange or adsorption media waste and the component; and disposing of the stabilized monolith.

14 Claims, 1 Drawing Sheet

(56) References Cited

OTHER PUBLICATIONS

"SW-846 Test Method 1311: Toxicity Characteristic Leaching Procedure," United States Environmental Protection Agency, Jul. 1992. https://www.epa.gov/hw-sw846/sw-846-test-method-1311-toxicity-characteristic-leaching-procedure.
"Interim Guidance on the Destruction and Disposal of Perfluoroalkyl and Polyfluoroalkyl Substances and Materials Containing Perfluoroalkyl and Polyfluoroalkyl Substances", Environmental Protection Agency, Dec. 18, 2020. https://www.epa.gov/system/files/documents/2021-11/epa-hq-olem-2020-0527-0002_content.pdf.
"Lawsuits and Limits Multiply With PFAS Chemicals Problem", by Mary B. Bowers, ENR, Jan. 18/25, 2021 (1 page enclosed).
Reed, Michael, and Jaclyn Looper. Avantech's Advanced Pfas Polymerization (AP2) Technology Development. AVANTech LLC, 2022 (9 pages enclosed).

* cited by examiner

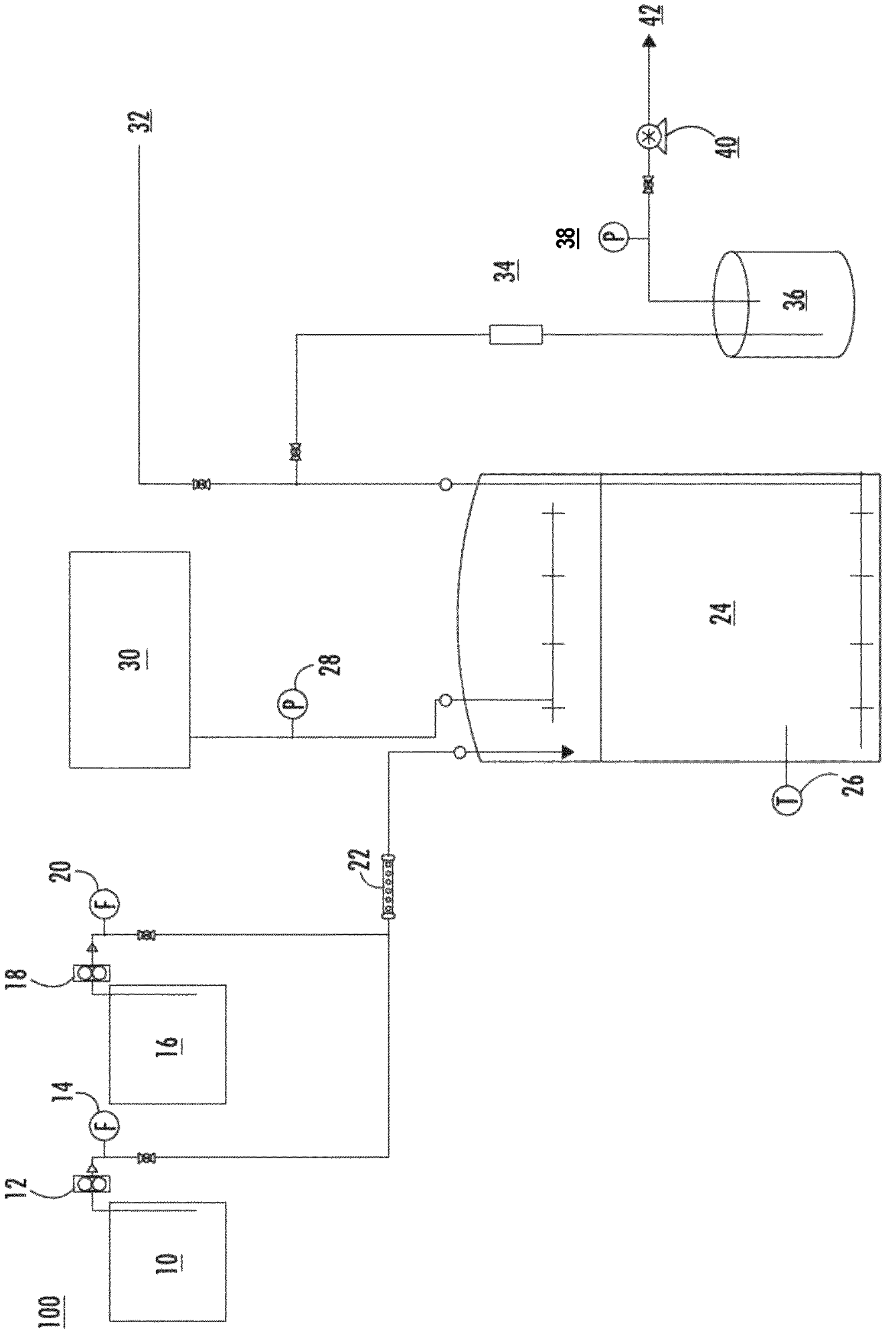
100
10
12
14
16
18
20
22
24
26
28
30
32
34
36
38
40
42
F
F
P
P
T

SYSTEM AND METHOD FOR PFAS CONTAMINATED WASTE POLYMER SOLIDIFICATION

CROSS-REFERENCE TO RELATED APPLICATIONS

This application is a utility application claiming priority from U.S. provisional patent application Ser. No. 63/151,958, filed on Feb. 22, 2021, in the United States Patent and Trademark Office. The disclosure of which is incorporated herein by reference in its entirety.

FIELD OF THE INVENTION

The present invention relates to contaminated waste, more particularly to a system and method for per- and polyfluorinated substances (PFAS) contaminated waste polymer solidification.

BACKGROUND OF THE INVENTION

Per- and polyfluorinated substances (PFAS), previously referred to as perfluorochemicals (PFCs), are a group of chemicals used to make fluoropolymer coatings and products that resist heat, oil, stains, grease, and water. Fluoropolymer coatings can be used in such varied products as clothing, furniture, adhesives, food packaging, heat-resistant non-stick cooking surfaces, and the insulation of electrical wire. Many chemicals in this group, including perfluorooctane sulfonic acid (PFOS) and perfluorooctanoic acid (PFOA), have been a concern because they do not break down in the environment, can move through soils and contaminate drinking water sources, and they build up (bioaccumulate) in fish and wildlife. PFAS have been found in rivers and lakes and in many types of animals on land and in the water.

PFAS, known as the forever chemical, is being legislated for clean-up in groundwater and drinking water. As a result, there has been much work done on capturing the PFAS. Numerous methods have been developed including ion exchange, carbon adsorption, reverse osmosis, among other methods.

As the PFAS material is captured it raises another problem with the disposition of the final waste stream. The current methods for treating the final waste include disposition in a hazardous waste disposal site or incineration. Each of these techniques present additional problems including final disposal leaving the potential for PFAS to be released back into the environment. Regarding incineration, the polyfluorinated material is not completely oxidized unless the incineration is performed at a significant temperature for a significant time. If not properly incinerated the material can be distributed through the off-gas system back into the environment.

Thus, there is a need for a system and method of removal of PFAS that overcomes the aforementioned disadvantages and problems associated with existing systems and methods.

SUMMARY OF THE INVENTION

The present invention relates to a system and method for per- and polyfluorinated substances (PFAS) contaminated waste polymer solidification.

In an embodiment of the present invention, a system for immobilizing PFAS is provided. The system comprises a specialty ion exchange vessel. The specialty ion exchange vessel is a pressure vessel. The pressure vessel houses ion exchange (IX) resin or adsorption media. Examples of commercially available ion exchange (IX) resin or adsorption media include, but are not limited to, activated carbon, among others.

The pressure vessel is capable of allowing a polymer and/or a bonding agent to be introduced. Examples of polymer, co-polymer and/or bonding agents include, but are not limited to, polyamide hardeners, epoxy resin, vinyl ester resin, epoxy vinyl ester resin, or a combination thereof. The pressure vessel allows a polymer or bonding agent to fill the pressure vessel. The pressure vessel is capable of withstanding an exothermic reaction of the polymer or bonding agent. The pressure vessel is the final disposal package.

In an embodiment of the present invention, an economical method of immobilizing per- and polyfluorinated substances (PFAS) is provided. The method generally comprises: providing a pressure vessel containing an ion exchange or adsorption media; capturing a per- and polyfluorinated substance (PFAS) via ion exchange or adsorption in the pressure vessel thereby contaminating the ion exchange or adsorption media; introducing into the contaminated ion exchange or adsorption media in the pressure vessel a component selected from the group consisting of a polymer, a co-polymer, a bonding agent, and a combination thereof; forming a final product of a stabilized monolith from the contaminated ion exchange or adsorption media and the component. The introduction occurs upon exhaustion of the ion exchange or adsorption media. The method further comprises disposing of the stabilized monolith. The stabilized monolith meets the EPA criteria for shallow land disposal.

In an embodiment of the invention, the PFAS exhausted ion-exchange (IX) resin is removed from the original pressure vessel and sluiced into a different vessel. This may be an even more economical approach. The method generally comprises: providing a pressure vessel containing an ion exchange or adsorption media; capturing a per- and polyfluorinated substance (PFAS) via ion exchange or adsorption in the pressure vessel thereby contaminating the ion exchange or adsorption media; sluicing the ion exchange or adsorption media from the pressure vessel into a separate disposal vessel; introducing into the contaminated ion exchange or adsorption media in the disposal vessel a component selected from the group consisting of a polymer, co-polymer, a bonding agent, and a combination thereof; and forming a final product of a stabilized monolith from the contaminated ion exchange or adsorption media/waste and the component.

The disposal vessel is capable of allowing a polymer or a bonding agent to be introduced and fill the disposal vessel and of withstanding the exothermic reaction of the polymer or bonding agent. In this instance, the disposal vessel is the final disposal package. Municipalities, industries, and others that have PFAS contamination have a need for the system and method of the present invention which provides for disposal of the exhausted media.

A major benefit of the present invention is to allow for safe disposal in a landfill of PFAS contaminated waste. The encapsulated polymerized waste prevents PFAS leaching into the landfill leachate, which is currently problematic for disposal. Under normal treatment operations (municipal biological treatment), any PFAS inside the landfill leachate is not removed. The PFAS goes through the treatment cycle and may eventually end up in a drinking water source. This creates a loop where media is employed to remove PFAS from a water source, the media is disposed in landfill, leaches out into the leachate, is impossible to destroy in normal treatment scenarios, and then is re-introduced into the environment. This scenario is similar to potential consequences of incineration, where the PFAS is simply volatilized out the stack and not destroyed. The PFAS then falls back to a water source and re-pollutes a drinking water source. Both typical landfill disposal and incineration are simply cycling the PFAS contamination. An encapsulated waste as described in the present invention will prevent leaching of PFAS back into the environment and eliminate the need for incineration. In regard to waste loading, the final solidified monolith can be 30 weight % to 70 weight % waste and 30 weight % to 70 weight % polymer, typically 50% of each.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 1 illustrates a process flow diagram for per- and polyfluorinated substances (PFAS) contaminated waste polymer solidification in accordance with the present invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Further, the term “or” as used in this disclosure and the appended claims is intended to mean an inclusive “or” rather than an exclusive “or.” That is, unless specified otherwise, or clear from the context, the phrase “X employs A or B” is intended to mean any of the natural inclusive permutations. That is, the phrase “X employs A or B” is satisfied by any of the following instances: X employs A; X employs B; or X employs both A and B. In addition, the articles “a” and “an” as used in this application and the appended claims should generally be construed to mean “one or more” unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of “a,” “an,” and “the” may include plural references, and the meaning of “in” may include “in,” “at,” and/or “on,” unless the context clearly indicates otherwise. The phrase “in one embodiment,” as used herein does not necessarily refer to the same embodiment, although it may.

Referring to the figures, FIG. 1 illustrates a process flow diagram for per- and polyfluorinated substances (PFAS) contaminated waste polymer solidification in accordance with the present invention. In the process flow diagram, more than one polymer is used. However, more than one polymer is not required for purposes of the method of the present invention.

As shown in process 100 of FIG. 1, a polymer A is stored in a tote or other storage container 10. Polymer A is pumped from storage container 10 through a first injection pump 12. A flow meter 14 measures flow of polymer A.

A polymer B is stored in a tote or other storage container 16. Polymer B is pumped from storage container 16 through a second injection pump 18. A flow meter 20 measures flow of polymer B.

Polymer A and polymer B meet and enter a static mixer 22. Static mixer 22 can be replaced with an inline mixer to combine polymer A, polymer B, and contaminated ion exchange media. This option is available if, for example, the water treatment vessel is not also used as the final disposal container. After exiting static mixer 22, the mixed polymer enters a replaceable ion exchange treatment vessel and solidification disposal container 24. Replaceable ion exchange treatment vessel and solidification disposal container 24 contains an ion exchange (or granulated activated carbon) media. Replaceable ion exchange treatment vessel and solidification disposal container 24 is a pressure vessel, preferably suitable for a pressure<15 PSIG. Ion exchange treatment vessel and solidification disposal container 24 is capable of being removed and disposed of after the waste treatment and solidification process of the present invention.

Temperature measurements are taken by device 26 to record exotherm after/during curing process of solidification.

A pressurized line forces water through ion exchange treatment vessel and solidification disposal container 24 to upstream water treatment processes 30. A device 28 measures the pressure in the line.

Treated water discharge 32 is removed from ion exchange treatment vessel and solidification disposal container 24. A dewatering and vacuum line may be used during the solidification process leading to a catch drum 36. A sight glass 34 is used to determine if a liquid or vapor composition. Catch drum 36 has a line with a pressure relief valve and a pressure measurement device 38. The line continues through a pump 40 to pull vacuum and to wastewater treatment or atmosphere shown as 42.

In an aspect of the invention, a swelling additive can be used to effectively reduce leaching from the polymer monolith. The amount of leaching can be reduced dramatically with this addition. Preferably, the swelling additive is a bentonite clay. It is preferable for the bentonite clay to be very fine, such as having a mesh size of 200 # or greater. Bentonite clay is typically added between 0.5 weight % to 3 weight %, based on the weight of contaminated ion exchange or adsorption media/waste.

In an aspect of the invention, the bentonite is added directly to the contaminated ion exchange or adsorption media, thoroughly mixed, and then two polymers are added.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method comprising:

providing a pressure vessel containing an ion exchange or adsorption media;

capturing a per- and polyfluorinated substance (PFAS) via ion exchange or adsorption in the pressure vessel thereby contaminating the ion exchange or adsorption media;

sluicing the ion exchange or adsorption media from the pressure vessel into a separate disposal vessel;

introducing into the contaminated ion exchange or adsorption media in the disposal vessel a component selected from the group consisting of a polymer, a co-polymer, a bonding agent, and a combination thereof; and forming a final product of a stabilized monolith from the contaminated ion exchange or adsorption media and the component, wherein the polymer, the co-polymer, or the bonding agent is selected from the group consisting of a polyamide hardener, an epoxy resin, a vinyl ester resin, an epoxy vinyl ester resin, and a combination thereof.

2. The method according to claim 1, wherein the sluicing occurs upon exhaustion of the ion exchange or adsorption media.

3. The method according to claim 1, further comprising disposing of the stabilized monolith.

4. The method according to claim 3, wherein the stabilized monolith is in a form of a solidified product.

5. The method according to claim 1, wherein the adsorption media is an activated carbon.

6. The method according to claim 1, wherein the disposal vessel is capable of withstanding an exothermic reaction.

7. The method according to claim 1, wherein the disposal vessel is a final disposal package.

8. The method according to claim 1, wherein the pressure vessel is suitable for a pressure of <15 psig.

9. The method according to claim 1, further comprising adding a swelling additive to the contaminated ion exchange or adsorption media.

10. The method according to claim 9, wherein the swelling additive is a bentonite clay.

11. The method according to claim 10, wherein the bentonite clay is added in an amount of 0.5 weight % to 3 weight % by weight, based on a weight of the contaminated ion exchange or adsorption media.

12. The method according to claim 10, wherein the bentonite clay has a mesh size of 200 # or greater.

13. The method according to claim 9, wherein the swelling additive is added prior to the introduction of the component.

14. A method comprising:

providing a pressure vessel containing an ion exchange or adsorption media;

capturing a per- and polyfluorinated substance (PFAS) via ion exchange or adsorption in the pressure vessel thereby contaminating the ion exchange or adsorption media;

sluicing the ion exchange or adsorption media from the pressure vessel into a separate disposal vessel;

introducing into the contaminated ion exchange or adsorption media in the disposal vessel a component selected from the group consisting of a polymer, a co-polymer, a bonding agent, and a combination thereof;

adding a swelling additive to the contaminated ion exchange or adsorption media, wherein the swelling additive is added prior to the introduction of the component; and forming a final product of a stabilized monolith from the contaminated ion exchange or adsorption media and the component;

wherein the component is a combination of two epoxy resins.

* * * * *